United States Patent [19]

Ganser

[11] Patent Number: 4,946,103
[45] Date of Patent: Aug. 7, 1990

[54] ELECTRONICALLY CONTROLLED FUEL INJECTOR

[75] Inventor: Marco A. Ganser, Zürich, Switzerland

[73] Assignee: Ganser-Hydromag, Switzerland

[21] Appl. No.: 276,415

[22] Filed: Nov. 25, 1988

[30] Foreign Application Priority Data

Dec. 2, 1987 [CH] Switzerland .................. 04792/87

[51] Int. Cl.⁵ .......................................... F02M 47/02
[52] U.S. Cl. ...................................... 239/88; 239/95; 239/585; 251/129.15
[58] Field of Search ...................... 239/88, 91, 95, 96, 239/533.12, 533.9, 533.6, 533.3, 533.2, 584, 585; 251/129.15, 129.16, 129.18, 129.21

[56] References Cited

U.S. PATENT DOCUMENTS

| | | | |
|---|---|---|---|
| 1,690,893 | 11/1928 | Dorner | 239/533.11 |
| 2,881,980 | 4/1959 | Beck et al. | |
| 3,241,768 | 3/1966 | Croft | 239/533.12 |
| 3,368,789 | 2/1968 | Martin | |
| 3,597,584 | 8/1971 | Haar | |
| 3,610,529 | 10/1971 | Huber | |
| 4,092,001 | 5/1978 | Hofmann | 239/533.6 |
| 4,129,256 | 12/1978 | Bader, Jr. et al. | |
| 4,566,416 | 1/1986 | Berchtold | |
| 4,690,373 | 9/1987 | Linder et al. | |
| 4,798,186 | 1/1989 | Ganser | 239/585 |
| 4,826,080 | 5/1989 | Ganser | 239/585 |

FOREIGN PATENT DOCUMENTS

| | | |
|---|---|---|
| 0196265 | 10/1986 | European Pat. Off. |
| 0264640 | 4/1988 | European Pat. Off. ............ 239/585 |
| 1539112 | 4/1972 | Fed. Rep. of Germany |
| 2183351 | 12/1973 | France |
| 2543647 | 10/1984 | France |
| 1357552 | 6/1974 | United Kingdom |

Primary Examiner—Andres Kashnikow
Assistant Examiner—Karen B. Merritt
Attorney, Agent, or Firm—Lowe, Price, LeBlanc, Becker & Shur

[57] ABSTRACT

The injector 10 for intermittently injecting fuel under high pressure in an internal combustion engine is provided with an injector valve member (18). The movement of this injector valve member (18) to open and close a fuel discharge orifice (24) is controlled by the fuel pressure in a control chamber (40) acting on a valve piston (26) on the side opposite to the discharge orifice (24). A cylindrical member (36) surrounds the upper part (30) of the valve piston (26). Energization of a solenoid (44) results in the opening of a pilot valve (46) and a subsequent quick drop of the fuel pressure in the control chamber (40). The solenoid (44) in addition to its function as a high speed actuator for the pilot valve (46) is also used to carry and transmit the force resulting from the fuel pressure in the control chamber (40) and acting on the cylindrical member (36), on the solenoid (44) and on further members (48, 50, 52, 14). Since the solenoid (44) can therefore be mounted directly within the injector housing (14), the design of the injector (10) can be very compact and simple.

28 Claims, 5 Drawing Sheets

ELECTRONICALLY CONTROLLED FUEL INJECTOR

TECHNICAL FIELD

The present invention relates to an electronically controlled fuel injector for internal combustion engines which is particularly suited for the direct injection at a high fuel pressure into the combustion chamber of the internal combustion engine.

BACKGROUND AND SUMMARY OF THE INVENTION

When the injector is electromagnetically operated, the injector needle valve is opened and closed by fuel pressure differential forces acting on both sides of an injector needle valve piston. An electromagnetically driven pilot valve controls the fuel pressure level on the back-side of the injector needle valve piston.

Different designs of fuel injectors of this type with an electromagnetic control of the injector needle valve are known and disclosed for example in the following publications: U.S. Pat. Nos. 2,881,980, 3,610,529 and 4,566,416 and European Published Patent Application No. 0 228 578. The injectors disclosed in the above mentioned publications are bulky, either because of the length of the injector and/or because of the particular design of the members responsible for the electromagnetic control of the injector needle valve. If these known injectors are used in small internal combustion engines, such as passenger car engines, this bulkiness is a considerable drawback. In addition, the above mentioned, relatively complex injector designs are expensive to manufacture. This is also playing a very important role in an application for small engines.

It is now a first object of the present invention to offer a very simple and compact design of the fuel injector with definite space-and price advantages compared to the prior art solutions. An injector design is simple if the number and the dimensions of the single components are small and if the number of tight fits and accurately machined surfaces are minimized. Furthermore the geometrical shape of the components must be so that the parts can be manufactured in a simple way. Finally it is an advantage if the finished components can be assembled and the complete injector can be calibrated by automated assembly and calibration machines.

It is a further object of the present invention to provide a fuel injector of very simple design which allows at the same time an improved control of the fuel injector performance compared to the prior art injectors. This is particularly the case when small amounts of fuel must be metered at a high fuel pressure during every intermittent injection event. This advantage, according to the present invention, is achieved by using a particular design of the electromagnets and electromagnetically driven pilot valves in conjunction with the hydraulically driven injector needle valve.

Those and further advantages of the invention become apparent from the following detailed description of various embodiments shown in the drawings.

DETAILED DESCRIPTION OF THE PREFERRED EMBODIMENTS

Figure 1:
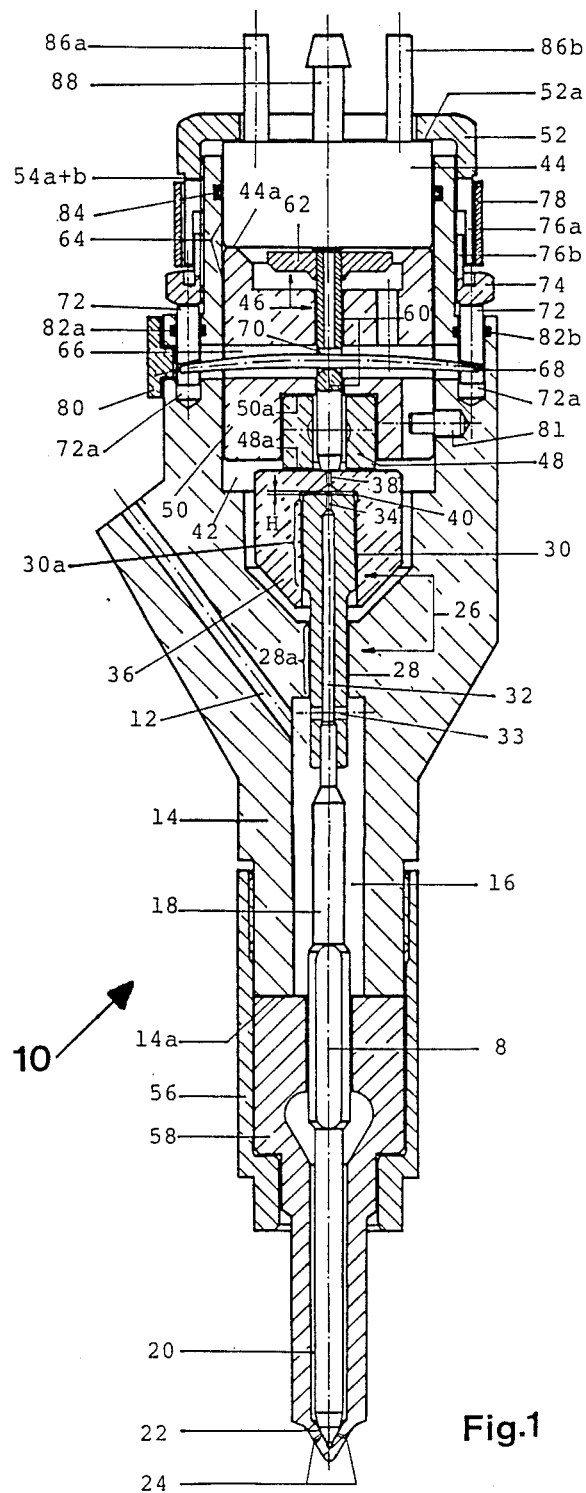
FIG. 1 is an axial sectional view of an electronically controlled fuel injector according to the present invention.

Turning to FIG. 1, a fuel injector of compact design in accordance with the present invention is designated by the numeral 10, and with reference to the other Figures like numerals represent like parts throughout the several Figures shown. The compact injector 10 is employed in a fuel injector system (not illustrated) for injecting pressurized fuel into the combustion chamber of an internal combustion engine.

The pressurized fuel supplied by a fuel pressure pump (not shown) enters the injector housing 14 through a passage 12 connected to a space or chamber 16 machined in the injector housing 14 which houses an injector needle 18. The injector needle valve 18 extends downwards to a valve seat 22 in a passage 20 of an injector tip 58. As shown in FIG. 1 the injector needle valve 18 is engaged with the valve seat 22 and therefore blocks the passage of fuel from the injector 10 through injection orifices 24 into the combustion chamber of the related internal combustion engine (not illustrated). The injection orifices 24 are machined into the injector tip 58. The tip 58 is engaged by a nut 56 and pressed onto a surface 14a of the injector housing 14 to prevent leakage of fuel from the space 16 to the outside of the injector 10.

In the upper portion, the injector needle valve 18 is provided with a needle valve piston 26 with two sections 28 and 30 of different outer diameters. The section 28 with the smaller outer diameter is slidably guided in a tight-fitted manner in a guide-bore 28a of the injector housing 14. The tight fit between guide-bore 28a and the section 28 of the needle valve piston 26 greatly reduces fuel leakage from the high pressure section 16 of the injector 10 into an upper neighboring low pressure region 42.

The needle valve piston 26 with two sections 28 and 30 of different outer diameters is firmly connected to the injector needle valve 18, either because the valve piston 26 is made of one piece with the injector needle valve 18, or by pressfitting or welding the parts together as shown in FIG. 1. In the inside of the needle valve piston 26 with two sections 28 and 30 is provided a bore 32 which is connected at one end by means of a side bore 33 to the space 16 of the injector 10. On the other end bore 32 connects to a much smaller bore or orifice 34. The orifice 34 extends to the top end surface of the thicker section 30 of the needle valve piston 26. The thicker section 30 is guiding on its outer diameter a piece 36 by means of a tight slide-fit guide 30a. The piece 36 is closed at the upper end which is provided with an orifice 38. Internally the piece 36 defines, together with the thicker section 30 of the needle valve piston 26, a small space or chamber 40. Both orifices 34 and 38 are axially aligned and extend in the direction of the longitudinal axis 8 of the injector 10.

A pilot or solenoid valve 46 comprises a valve stem 60 made of hard material and a valve plate 62 made of a soft electromagnetic material and firmly connected with the valve stem 60. As shown in FIG. 1, the pilot valve 46 which can be actuated by means of a solenoid 44, is closing the outlet of the orifice 38, thus preventing the fuel from flowing through the orifice 38 into the neighboring low pressure region 42. The cylindrical piece 36, due to the force resulting from the fuel pressure in the small chamber 40, will be pressed against a plane contacting surface 48a of a member 48. The member 48, together with further elements mounted within the injector 10, determines the axial position of the cylindrical piece 36. It is an important feature that the cylindrical piece 36 is guided only by the thicker section 30 of the needle valve piston 26 and is not guided on its outer circumference. This allows a substantially leak-free, seal-tight design and an unhindered axial motion of the injector needle valve 18 during the injection event. If the piece 36 had to be guided also on its outer circumference, jamming of the needle valve piston 26 or at least undesired high frictional forces would occur in case all tight fits needed for a tight seal were not perfectly concentrical to one another.

The member 48 is slidable in a direction perpendicular to the longitudinal axis 8 of the injector 10. This allows to set the amount of travel of the pilot valve 46, as will be explained later during the description of the FIGS. 2 and 3.

A guide piece 50 is transmitting to the solenoid 44 by means of contacting surfaces 50a and 44a the axial hydraulic force which is transmitted from the cylindrical piece 36 to the member 48. This axial force resulting from the fuel pressure in the small chamber 40 will be transmitted from the solenoid 44 to the solenoid retaining nut 52 by means of the contacting surface 52a. Finally, the axial force is transmitted by a thread 54a of the solenoid retaining nut to the corresponding thread 54b provided at the injector housing 14. The path of the axial force resulting from the fuel pressure will be closed by a nut 56, a tip 58 and the injector needle valve 18.

The solenoid 44, like the plate 62, is made of soft electromagnetic material. The electromagnetic properties (magnetization and dynamic response) are adversely affected by mechanical tensions (material stresses). This fact would negatively influence the behavior of the solenoid 44 and therefore of the solenoid valve 46 if the solenoid 44 would be used to carry the axial force resulting from the fuel pressure in the small chamber 40 without taking preventive measures.

Figure 4:
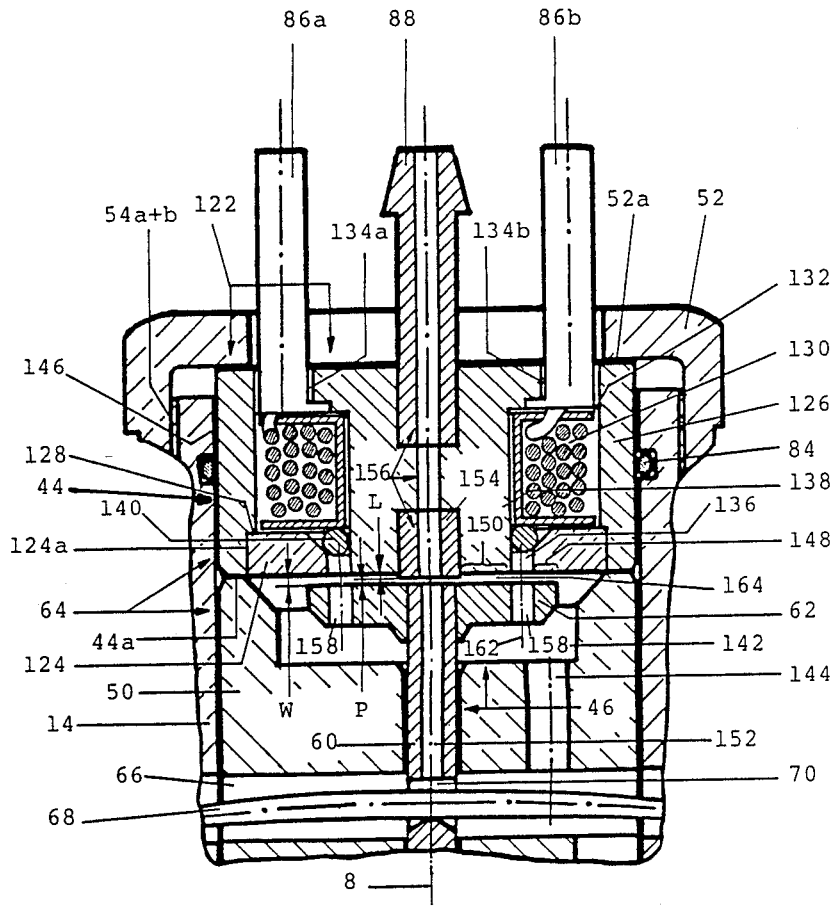
FIG. 4 is a partial, axial sectional view of the particular solenoid and pilot valve design of the present invention.

The reason why the solenoid 44 can be used as force transmitting element without impairing the proper function thereof will become apparent during the description of FIG. 4, where the design of the solenoid 44 is explained in detail. However, even from FIG. 1, one recognizes that the contacting surfaces 44a and 52a are arranged at a radial distance from the longitudinal axis 8 which is fairly bigger than the radius of the solenoid valve plate 62. This fact together with the internal layout of the solenoid 44 according to the present invention enables the solenoid 44 to perform both the task of a fast responding device and of a carrying member of the axial force resulting from the fuel pressure in the small chamber 40. In the injector design according to the European Published Patent Application No. 0 228 578 it is necessary to place the solenoid in an additional housing. This housing is used to carry the axial hydraulic force resulting from the fuel pressure and to prevent mechanical loads from disturbing the correct function of the solenoid. However, this housing results in increased dimensions of the injector as well as in additionally needed components compared to the design according to the present invention.

The solenoid 44 and the guide-piece 50 of the present invention are placed directly and without additional housing in a bore 64 of the injector housing 14. Besides the advantage of a very compact design, all other positive attributes of the design according to said European Published Patent Application 0 228 578 are maintained, namely:

the injector needle valve 18 along with the needle valve piston 26, the cylindrical piece 36, the member 48, the guide-piece 50, the pilot valve 46 and the solenoid 44 can be mounted in the injector housing 14 from the side of bore 64;

the injector housing 14 is made out of one work piece and presents no cross sections through a region with high fuel pressure which then would have to be sealed;

the axial tolerances of all injector components placed along the longitudinal axis 8 can be large, since they can be compensated for by the position of the solenoid retaining nut 52 once the injector has been fully assembled. Therewith one can always set the desired maximum possible lift H of the injector needle valve 18 regardless of the variations of the lengths of the injector components of each injector.

In a cross bore 66 of the injector housing 14 and of the guide-piece 50 there is located a pilot valve spring 68 which is constructed as a bending spring in the form of a round bendable bar extending through a bore 70 machined in the stem 60 of pilot valve 46 and transmitting its elastic bias force onto the under side of said bore 70. The pretensioning force of the pilot valve spring 68 can be set by moving both ends of the spring 68 by means of two slotted pins 72. Each one of the pins 72 is guided in a bore 72a of the injector housing 14. An adjusting nut 74 threaded on the lower portion of the thread 54b of the injector housing 14 is used to determine the axial position of the two pins 72 and therefore serves to determine the spring bias force to the pilot valve stem 60. This pretensioning operation can be performed once the injector 10 is fully assembled.

The adjusting nut 74 and the solenoid retaining nut 52 are provided with slotted sleeves 76a and 76b. The slotted sleeve 76b of the adjusting nut 74 is provided with a thread at its inner surface which corresponds to the thread of the adjusting nut 74. Once the desired values of maximum injector valve lift H and of the bias force of the pilot valve spring 68 are set, the position of the solenoid retaining nut 52 and of the adjusting nut 74 can be blocked by means of a clamp 78 and elastic deformation and pressing of slotted sleeves 76a and 76b against each other and against the thread 54b of the injector housing 14. Thus an undesired rotation of the nuts 52 and 74 after the correct calibration of the injector can be prevented.

Furthermore the injector 10 is provided with a side-cover 80 which can be removed to install or remove the pilot valve spring 68 as well as with a pin 81 to prevent the rotation of the guide piece 50. Three O-rings 82a, 82b and 84 seal the low pressure region 42 of the injector 10. A fuel return piece 88 allows fuel under low pressure to be returned from the low pressure region 42 back to the fuel tank (not shown). In this regard further details will be discussed during the description of FIG.

4. Two plugs 86a and 86b which are the terminals of the coil of the solenoid 44 serve as connectors for connection to the solenoid driver unit (not shown).

The mode of operation of the injector 10 is the following:

When at a desired point of time the solenoid 44 is energized by an electric pulse of a predetermined duration, the pilot valve 46 is operated and the pilot valve stem 60 is retracted from its seat, thus opening the outlet of the orifice 38. In the same way as explained in the afore-mentioned European Published Patent Application No. 0 228 578 the fuel pressure in the small chamber 40 drops abruptly. The fuel pressure acting on the lower side of the lower section 28 with the smaller outer diameter of the injector needle valve piston 26 can now shift the needle valve 18 in its opened position and the injection event begins by the discharge of fuel across the seat 22 and through the injection orifices 24.

If the electric pulse to the solenoid 44 is interrupted, the pilot valve 46 is quickly shifted back to its seat at the outlet of the orifice 38 by means of the biasing spring 68. The pressure in the small chamber 40 will abruptly rise. Due to the differential area between the upper, bigger piston 30 and the lower, smaller piston 28 it will be possible at any point in time to quickly reseat the injector needle valve 18 and therefore terminate the injection event.

Figure 2:
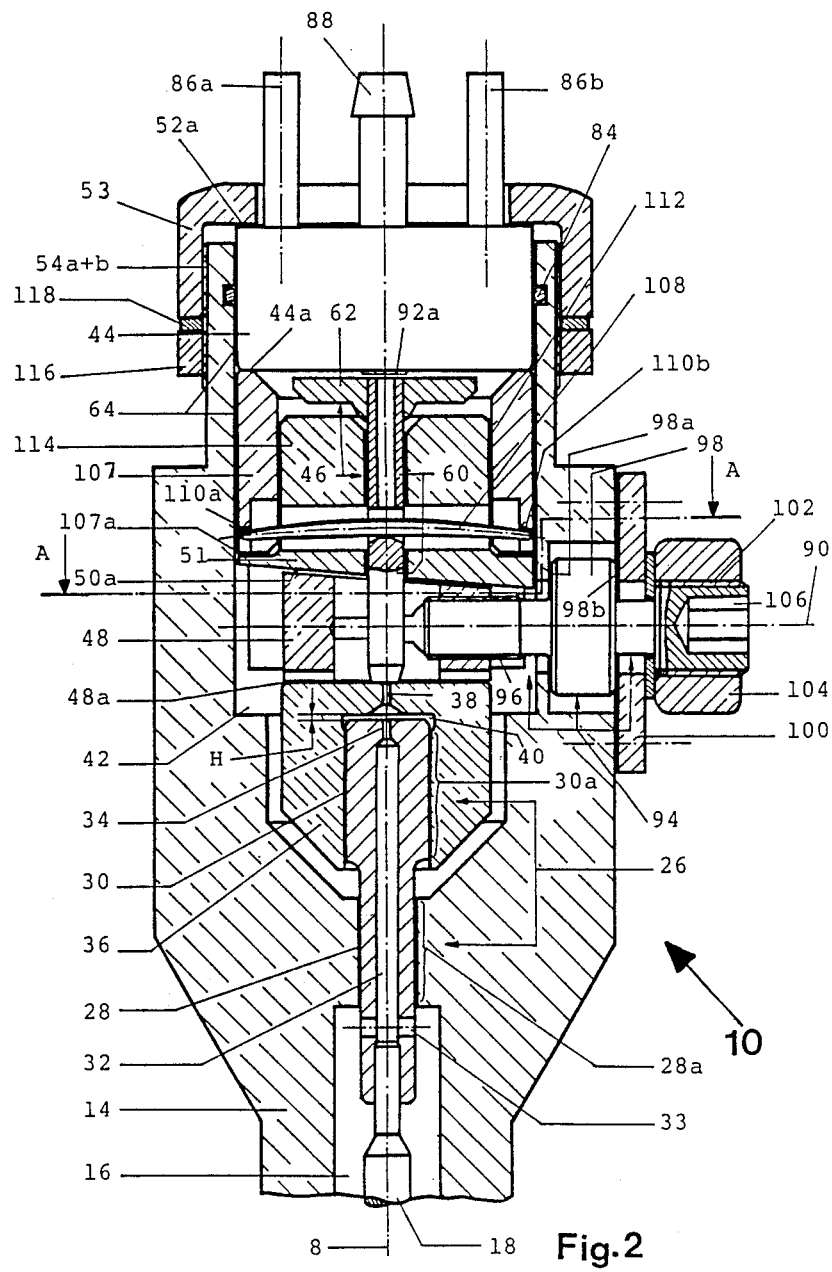
FIG. 2 is an axial sectional view of a first alternate embodiment of the upper part of the fuel injector of FIG. 1.

FIG. 2 is an axial sectional view of the upper part of injector 10 in a sectional plane perpendicular to the sectional plane of FIG. 1. In this way one can see that the amount of travel of the pilot valve 46 can be adjusted to its correct value by moving the member 48 perpendicularly to the injector's longitudinal axis 8. In addition FIG. 2 illustrates an alternative mechanism to adjust the pretension of the pilot valve spring.

The contacting plane 50a between the member 48 and the guide-piece 51 is inclined with respect to the contacting plane 48a between the member 48 and the cylindrical piece 36. This contacting plane 48a is perpendicular to the longitudinal axis 8. A sliding motion of the member 48 in radial direction along an axis 90 which is also perpendicular to the injector's longitudinal axis 8, brings about a change in the length of the possible path of travel of the pilot valve 46 between the plane surface 48a and a solenoid valve stop surface 92a of the solenoid 44. This path of travel is performed back and forth by the pilot valve 46 every time when the solenoid 44 receives an electric pulse of a predetermined duration.

An adjustment screw 94 is provided with a thread 96 by means of which it can be threaded into the member 48 as well as with a thicker, round portion 98 with an inner, planar ring-shaped surface 98a which is contacting a corresponding surface of the injector housing 14 for determining the inner radial position of the adjustment screw 94. A cover 100 contacting an outer planar surface 98b clamps the adjustment screw 94. At the same time, the cover 100 seals the low pressure region of the injector 10. The adjustment screw 94 furthermore is provided with a second thread 102, onto which a countering nut 104 is threaded as well as with an internal hexagonal bore 106 for rotating the adjusting screw 94 about the axis 90 with an appropriate tool.

Different alternatives to the shown solution employing a countering nut 104 are possible. For example cover 100 can be provided with a toothed inner surface acting together with a corresponding toothed surface 98b of the adjustment screw 94. When the cover 100 is screwed in place, the rotation of the adjustment screw 94 is mechanically blocked. In another alternate embodiment the adjustment screw 94 is simply clamped at the two surfaces 98a and 98b. In both cases the portion of the adjustment screw 94 protruding out of the injector housing 14 including the countering nut 104 can be omitted.

A rotation of the adjustment screw 94 about the axis 90 will bring about a radial sliding motion of the member 48 and, due to the inclination of the planar surface 50a, a change of the possible amount of travel of the pilot valve 46. This adjustment operation can be performed from the outside with the injector 10 fully assembled. Preferably, the inclination of the planar surface 50a is such that when the member 48 is pulled by the adjustment screw 94 by threading the adjustment screw 94 into the member 48, the amount of possible path of travel of the pilot valve 46 is increased (as shown in FIG. 2). In this way any slack of the thread 96 and at the surface 98a will automatically be annulled during the adjustment operation and will not change during operation of the injector 10, since a force component pulling on the member 48 will be generated by the force resulting from the hydraulic pressure in the small chamber 40.

The injector design according to the present invention allows the execution of all needed adjustments once the injector 10 is fully assembled, namely of:
  the maximum possible injector needle valve lift H
  the bias force of the pilot spring, and
  the amount of travel of the pilot valve 46.

This is a great advantage compared to previous designs, since the injector 10 can be calibrated by an automatic machine without human help. It is furthermore possible to check and, if needed, readjust the injector to its desired performance during routine service work without the need of taking the injector apart and therefore greatly reducing the risk of dirt to enter the injector.

In principle, an injector allowing all needed adjustment operations to be performed with the injector fully assembled, has already been disclosed in the aforementioned European Published Patent Application No. 0 228 578. For this purpose, the solenoid, the pilot valve and the pilot valve spring of this known injector are placed perpendicularly to the longitudinal axis of the injector. Due to this fact it is by far not possible to realize such a compact injector design as proposed by the present invention. Furthermore, the fact that all essential components of the injector 10 of the present invention are placed along the longitudinal axis 8 represents a remarkable simplification in the manufacture of several injector components and in particular of the housing 14.

FIG. 2 also illustrates a sleeve 107 which is interposed between the modified guide piece 51 and the solenoid 44. The axial force resulting from the fuel pressure in the small chamber 40 will now also be carried by the sleeve 107. However, an additional contacting surface 107a between the modified guide-piece 51 and the sleeve 107 is needed. The pilot valve spring 108 is shorter compared to the corresponding spring 68 of FIG. 1, but its design is substantially the same. Both ends of the pilot spring 108 are pretensioned by two ramps or surfaces 110a and 110b provided in the sleeve 107. The ramps 110a and 110b are oblique. Therefore, a rotation of the sleeve 107 around the longitudinal axis 8 will bring about a change of pretension of the pilot valve spring 108.

The sleeve 107 is guided at its outer circumference by the bore 64 of the injector housing 14. The inner circumference 112 of the sleeve 107 radially guides the upper, smaller section 114 of the modified guide-piece 51. The sleeve 107 can also be rotated from the outside with the injector 10 fully assembled. However, the particular design enabling such an external adjustment operation is not illustrated here.

A solution similar to the one shown in FIG. 2 and explained above can be employed also to set the amount of travel of the pilot valve 46. In such an embodiment the member 48 is constructed similarly to the sleeve 107 and has one or more ramps either on its side facing the modified guide-piece 51 or on its side facing the cylindrical piece 36. A rotation of a member 48 modified in this manner around the axis 8 would then bring about a change of the amount of travel of pilot valve 46. Such a design is also not illustrated in detail here.

In place of the clamp 78 and the nut 74 of FIG. 1 a countering nut 116 and a washer 118 are provided in the embodiment of FIG. 2 to block the modified solenoid retaining nut 53.

The members 48, 50 and 52 in the embodiment of FIG. 1, the members 48, 51, 53 and 107 in the embodiment of FIG. 2 and the solenoid 44 in both embodiments are used to carry the axial force resulting from the fuel pressure in the small chamber 40 and transmit this force back to the injector housing 14. Care must be taken that the contacting surfaces 48a, 50a, 44a, 52a and 107a do not bring about lateral forces that are transmitted to the guide 30a of the upper piston of the injector needle valve 18. The side force induced by the inclined plane 50a is carried by the adjusting screw 94 and therefore is not disturbing. However, if one or more of the surfaces 48a, 44a, 52a and 107a are not perfectly perpendicular to the injector's longitudinal axis 8, or if the guide 28a for the lower section of the needle valve piston 26 is not aligned with the bore 64, undesired high frictional forces at the guides 28a and 30a can hinder a reliable and repeatable operation of the injector needle valve 18. This problem can be solved by making at least one of the contacting surfaces 44a, 52a or 107a slightly spherical in such a way that a slight non-perpendicularity can be compensated. For example the contacting surface 52a between the solenoid 44 and the solenoid retaining nut 52 could be slightly spherical.

Figure 3:
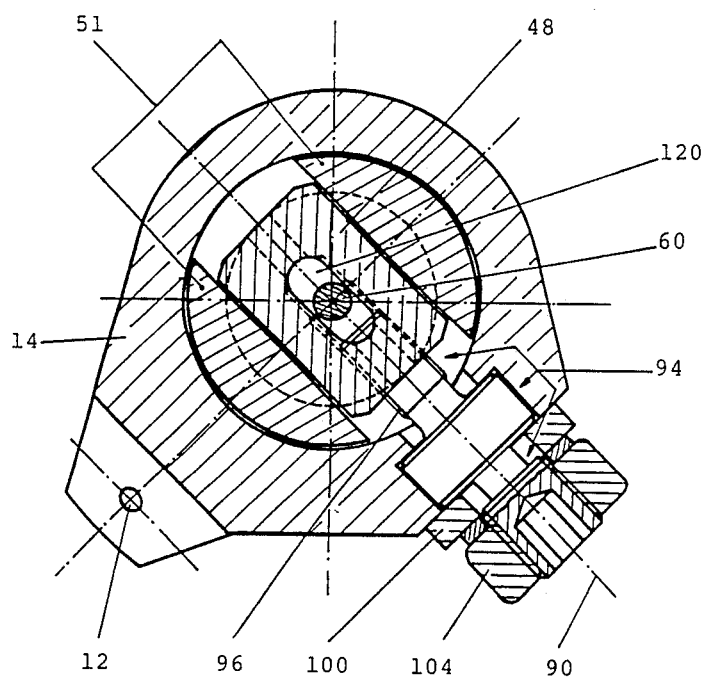
FIG. 3 is a cross section of the injector taken at substantially line A—A of FIG. 2.

FIG. 3 illustrates a cross section taken along the line A—A of FIG. 2 with the top view of the member 48 and of the adjustment screw 94. The member 48 is provided with a hollow portion 120 in which there is located the lower part of the stem 60 of the pilot valve 46. The hollow portion 120 is larger in the direction of the axis 90 than perpendicular thereto. A radial displacement of the member 48 by means of the adjustment screw 94 does therefore not influence in any way the correct function of the pilot valve 46.

FIG. 4 shows in detail the design of the solenoid 44, of the pilot valve plate 62 and of the upper part of the stem 60 of the pilot valve 46.

The solenoid 44 consists of a round body 122 and of a stator plate 124. The stator plate 124 is fitted in a bore 124a in an outer section 126 of the body 122 which is radially and axially determining the position of the stator plate 124 by means of its bore 124a and of a shoulder 128. A coil 130 is wound on a coil body 132 of plastic and is placed in the ring-shaped space delimited by the inside of the body 122 and by the inside surface of the stator plate 124. The two electrical connections 86a and 86b of the coil 130 protrude out of the two bores 134a and 134b on the back side of the body 122. An inner round section 138 of the solenoid body 122 protrudes through a central bore 136 of the stator plate 124. An O-ring 140 seals the ring-shaped space housing the coil 130 from fuel present in the region 142. The region 142 is connected through a bore 144 and by other passages of big cross sectional area compared to the cross sectional area of the two orifices 34 and 38 with the low pressure region 42 (see also FIGS. 1 and 2).

The side of the stator plate 124 facing the region 142 and the pilot valve plate 62 is in its essence flat and lies in the same plane as the front surface of the inner round section 138 of the solenoid body 122. The outer diameter of the pilot valve plate 62 is substantially smaller than the diameter of the circumference 146 of the solenoid body 122. Two pole faces 150 and 148 are defined between the surface of the inner round section 138 and the inner portion of the pilot valve plate 62 (first pole face 150) as well as between the outer portion of the pilot valve plate 162 and the inner portion of the stator plate 124 (second pole face 148). The two pole faces 148 and 150 are ring-shaped and have a substantially equal surface area. In comparison to the surface area of every single of the two pole faces 148 or 150, the cross sectional area of the outer section 126 of the solenoid body 122 and of the outer border of the stator plate 124 are substantially bigger.

To enable a very rapid movement of the pilot valve 46 immediately after the switching-on and switching-off of the electrical power to the coil 130, the pilot valve 46 and therefore the pilot valve plate 62 must have a very small mass and at the same time the electromagnetic material of the pole faces 148 and 150 must be saturated in order to obtain the biggest possible electromagnetic force with the smallest possible mass of the pilot valve plate 62. The proposed design produces a concentration of the electromagnetic flux at the pole faces 148 and 150 as well as in the sections of the electromagnetic loop which are free from mechanical stresses. These sections are: The pilot valve plate 62, the inner round section 138 of the solenoid body 122 and the inner portion of the stator plate 124.

Because the maximum concentration of the electromagnetic flux is reached at the pole faces 148 and 150, because the total flux is constant in any cross section of the electromagnetic loop and because the cross sectional areas of the outer section 126 of the solenoid body 122 and of the outer border of the stator plate 124 are substantially bigger compared to the surface of one pole face 148 or 150, the flux concentration in these portions of the electromagnetic loop will be much weaker. Due to this fact mechanical stresses in the outer section 126 do not influence the performance of the solenoid 44. Therefore, the outer section 126 of the solenoid body 122 can be used to carry and transmit the force arising from the pressure in the small chamber 40 (see FIG. 1) in addition to its function in the electromagnetic loop.

FIG. 4 also illustrates the layout of the fuel return path for the fuel discharged during each intermittent injection event from the small chamber 40 through the orifice 38 into the low pressure region 42. This return fuel is spilled back to the fuel tank by means of a fuel return line (not illustrated). The proposed fuel return path within the injector 10 of the present invention allows at the same time a compact design as well as a very stable and fast responding movement of the pilot valve 46.

The discharged fuel flows within the injector 10 from the low pressure region 42 by means of passages of big cross sectional area in both the region 142 and the side bore 66, where the pilot valve spring 68 is placed. From the side bore 66 the fuel can flow through bore 70 which is machined in the stem 60 of the pilot valve 46 in a further bore 152. The bore 152 is also machined in the stem 60 with its longitudinal axis coinciding with the injector's longitudinal axis 8. A stop member 154 is located in the inner round section 138 of the solenoid body 122 and is firmly connected to it, for example by bonding the stop member 154 into the inner round section 138. Both the stop member 154 and the stem 60 of the pilot valve 46 are made of hard material, for example of hardened steel. The stop member 154 protrudes beyond the pole face 150 by the amount L. A bore 156 with its longitudinal axis corresponding to the injector's longitudinal axis 8 is machined in the stop member 154, in the inner round section 138 and in the fuel return piece 88. The fuel return piece 88 is connected to the solenoid body 122 in a firm, seal-tight manner. Furthermore, the pilot valve plate 62 is provided with a number of bores 158, the graduated circle 162 of which is arranged in the middle of the ring-shaped slot 136 between the inner border of the stator plate 124 and the circumference of the inner round section 138. The diameter of the bores 158 is preferably about as large as the width of the ring-shaped slot 136. The bores 158 are equally spaced on the graduated circle 162, for example there can be four bores 158 spaced apart by 90°.

The pilot valve 46 including the pilot valve plate 62 are surrounded by fuel, since the region 142 and the different bores and passages as well as a disc-shaped space 164 between the pole faces 148 and 150 of the solenoid 44 and the side of the pilot valve plate 62 facing said pole faces are filled with fuel.

To correctly fulfill its function, the pilot valve 46 must be capable to move very fast. Additionally thereto, every stroke must be an exact reproduction of the foregoing one, provided that the same electric pulse is fed to the solenoid 44. We distinguish between a pull-in stroke during which the pilot valve 46 is lifted off its seat at the outlet of the orifice 38 and moves towards the stop member 154 and a return stroke in the opposite direction immediately after the end of an electric pulse. For either the pull-in or the return stroke the amount of travel of the pilot valve 46 corresponds to P.

During a fast movement of a plate in a liquid a hydraulic pressure acting in the direction opposite to the movement of the plate arises. In the present situation and without the preventive measures as proposed in the design according to the present invention, this hydraulic pressure would slow down the motion of the pilot valve 46 by a factor of 2.

The arrangement of the bores 158 as well as of the two bores 152 and 156, placed on the same longitudinal axis 8 is very effective in substantially reducing the hydraulic fuel pressure acting on the pilot valve plate 62 during its motion. When return fuel is discharged through the bores 152 and 156, then a fuel jet is formed in the two bores 152 and 156 and due to the resulting venturi-effect, a suction will be formed in the disc-shaped space 164 which greatly diminishes the fuel pressure acting on the surface of the pilot valve plate 62 facing the two pole faces 148 and 150. This effect is similar to the effect as described in the European Published Patent Application No. 0 228 578 which takes place in the two axially aligned orifices 34 and 38 (FIG. 1). It is clear that the formation of a fuel jet in the two bores 152 and 156 takes place at a fuel pressure substantially lower—by two orders of magnitude in most cases—compared to the total fuel pressure in the two orifices 34 and 38. The suction effect in the disc-shaped space 164 disappears shortly before the pilot valve 46 strikes the stop member 154, i.e. at a point in time when the movement of the pilot valve 46 is executed. The supporting action of the fast movement of the pilot valve 46 is at its maximum when the pilot valve 46 has performed a motion equal to about one half of the total travel, that means about P/2, because at this point enough fuel is discharged from the orifice 38 and therefore also from the bores 152 and 156. At this point also the hydraulic pressure acting on the pilot valve plate 62 is rapidly increasing, since the pilot valve 46 already has picked-up high speed. The design proposed in the present invention thus brings about the desired support of the fast acting movement of the pilot valve 46 at the right point in time.

Contrary to the pull-in movement which is very stable and repeatable, the return movement of the pilot valve 46 can show undesired instabilities if no appropriate measures are taken. To such measures belong firstly the stop member 154 and secondly the solution described above.

The maximum gap W between both pole faces 148 and 150 and the surface of the pilot valve plate 62 facing the pole faces 148 and 150 is bigger than the maximum amount of travel P of the pilot valve 46. When the pilot valve 46 is attracted by the solenoid 44 and strikes the stop member 154, a gap L is maintained between the pole faces 148 and 150 and the pilot valve plate 62. This gap L reduces in a known manner the remanence of the electromagnetic material when the current to the solenoid 44 is switched off and thus drastically reduces the electromagnetic adhering action which would retain the pilot valve 46 adhered for a too long time after the current switch-off. If the pilot valve plate 62 is surrounded by a liquid, as it is the present case, then a hydraulic adhering action is additionally hindering the return motion of the pilot valve plate 62 if the latter comes too close to the pole faces 148 and 150. The intensity of the hydraulic adhering action varies from one return stroke to the next one in an uncontrollable way. This is the main reason for disturbances in the release time of the pilot valve 46, if no effective precautionary steps are taken. To counteract this, both the remaining gap L and the bores 158, 152 and 156 are effective. The disc-shaped space 164, the volume of which is increasing during the return movement of the pilot valve 46 can be easily refilled with fuel through bores 158 and by the suction due to the arrangement of the bores 152 and 156.

As explained above, to build a remaining gap in an electromagnetic loop to reduce the release time of the solenoid valve is a well known method and is part of the known state of the art. In the solution proposed in the present invention, where a cylindrical stop member 154 is placed coaxially to the stem 60 of the pilot valve 46, the impacts resulting from the pilot valve 46 striking the member 154 are taken over by two hard pieces: the stem 60 and the stop member 154. The wear of the parts is greatly reduced due to this fact and therefore an extended life of the components is achieved. Additionally, the stop member 154 can be made of hardened steel which despite being an electromagnetic material does not disturb the desired dynamic behavior of the pilot valve 46, since the contacting surface between the pilot valve stem 60 and the stop member 154 is very small compared to the pole faces 148 or 150.

Figure 5:
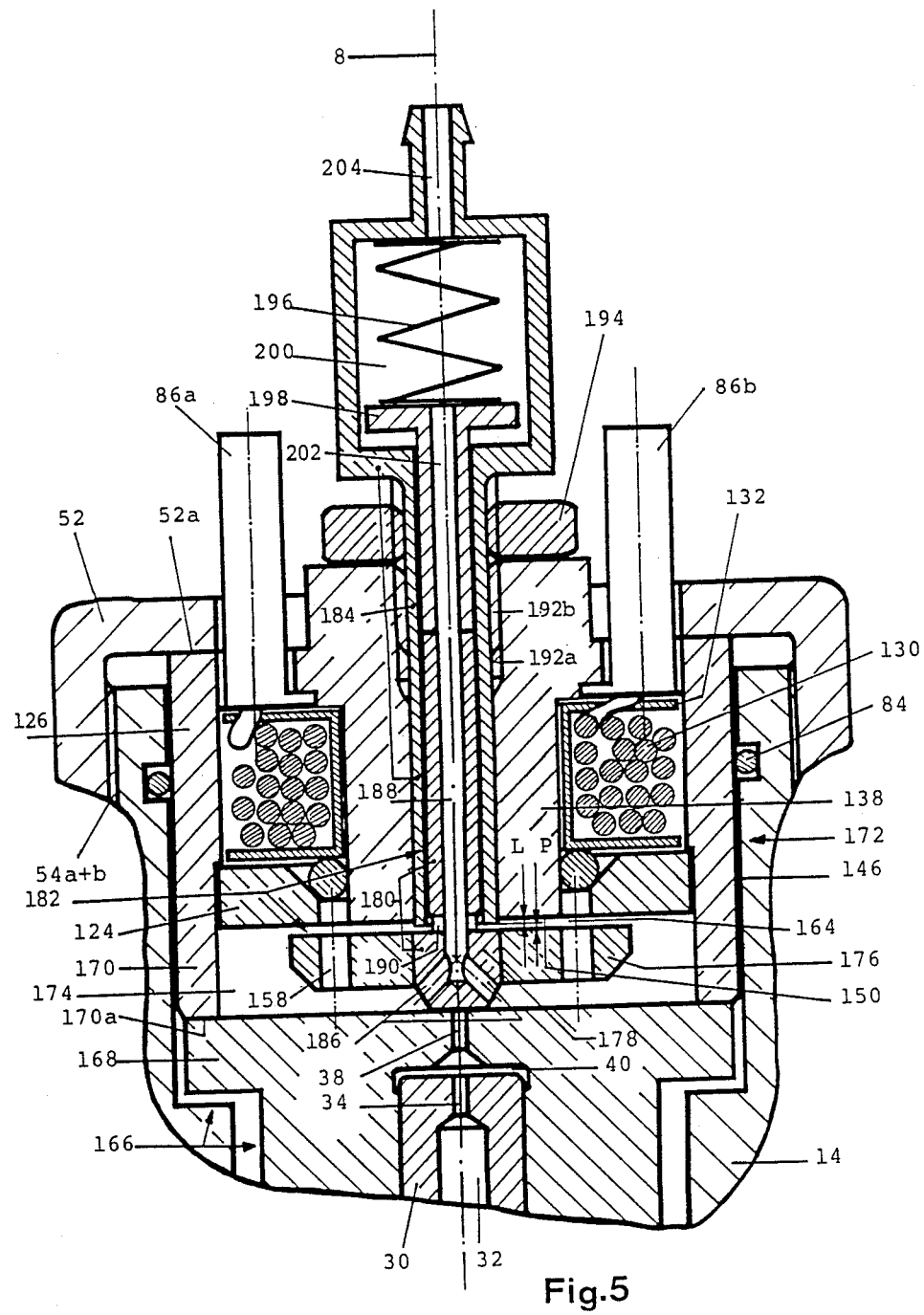
FIG. 5 is a partial, axial sectional view of a second alternate embodiment of the upper part of the fuel injector according to the present invention.

FIG. 5 illustrates an alternative design of the upper portion of the injector 10 according to the present invention. In this embodiment a cylindrical piece 166 guided by the upper section 30 of the needle valve piston 26 in the same way as shown in FIG. 1 has an enlarged upper portion 168. The upper plane surface of the cylindrical piece 166 contacts directly by means of a contacting surface 170a an elongated outer section 170 of a solenoid 172 to transmit the hydraulic force resulting from the fuel pressure in the small chamber 40. The stator plate 124 is arranged inside the elongated outer section 170. In a space 174 between the upper end surface of the cylindrical piece 166 and the stator plate 124 as well as the pole face surface of the inner round section 138 of the solenoid 172, a pilot valve plate 176 and the lower enlarged section 178 of a stem 180 of a pilot valve 182 is placed. The stem 180 extends into the inner bore of an elongated stop member 184 and is radially guided therein. Two bores 186 are machined in the lower enlarged section 178 of the stem 180 and connect the space 174 with a bore 188 machined in the inside of the stem 180. An additional side-bore 190 connects the disc-shaped space 164 with the bore 188. This layout of the bores 186, 188 and 190 brings about the same effect as realized in the design of FIG. 4 to substantially reduce the hydraulic pressure acting on the pilot valve plate 176 during the movement of the pilot valve 182.

To adjust the maximum amount of travel P of the pilot valve 182—an operation necessary to compensate for tolerance differences of the two orifices 34 and 38 from one injector 10 to another—the elongated stop member 184 can be axially positioned in the solenoid 172. For this purpose, an inner thread 192a is machined in the solenoid 172 and a corresponding outer thread 192b is machined in the upper part of the elongated stop member 184. By rotating the elongated stop member 184 and screwing it more or less in the thread 192a one can adjust the length L of the end of the elongated stop member 184 protruding beyond the surface of the pole face 150 and therefore adjust the pilot valve lift P. Once the desired pilot valve lift P has been set, one can block the elongated stop member 184 by means of the countering nut 194. A pilot valve spring 196 is transmitting its bias force to an intermediate piece 198 which is radially guided in the same bore of the elongated stop member 184 as the stem 180 of the pilot valve 182. The intermediate piece 198 transmits the elastic bias force of the pilot valve spring 196 to the stem 180. The spring 196 is placed in a chamber 200 at the upper end of the elongated stop member 184. The fuel return path extends through the bore 188 in the stem 180 and a bore 202 of the intermediate piece 198 and exits the chamber 200 through a bore 204.

The mode of operation of the embodiment according to FIG. 5 is analogous to the mode of the embodiments previously described.

While preferred embodiments of the present invention have been described for purposes of illustration, the foregoing description should not be deemed a limitation of the invention herein. Accordingly, various modifications, adaptations and alternatives may occur to one skilled in the art without departing from the teaching and scope of the present invention.

I claim:

1. A fuel injector for intermittently injecting fuel into a combustion chamber of an internal combustion engine, comprising an injector housing (14) with a valve seat (22) and at least one discharge orifice (24), an elongated injector valve member (18) provided with a piston member (26) and mounted within said housing (14) for engagement with said valve seat (22) for closing said discharge orifice (24), said injector valve member (18) being shiftable in its axial direction to be momentarily lifted from said valve seat (22) to open said discharge orifice (24) to allow for the injection of a desired quantity of fuel into the combustion chamber of the internal combustion engine, a control chamber (40) provided within said housing (14) and being connectable to a fuel supply line (12); the fuel pressure in said control chamber (40) acting upon said piston member (26) of said injector valve member (18) to force the latter against said valve seat (22), means (34, 38, 44, 46; 172, 182) for quickly reducing and quickly restoring the fuel pressure in said control chamber (40) to allow for the momentary axial movement of said injector valve member (18), said means for quickly reducing and restoring the fuel pressure in said control chamber (40) including a first orifice (34) and a second orifice (38) opening into said control member (40), electromagnetically controlled pilot valve means (46; 182) for closing and temporarily opening one end of said second orifice (38) and a solenoid (44; 172) for opening said pilot valve means (46; 182) depending upon applied electric pulses of a predetermined duration; at least one first member (36; 166) defining in part said control chamber (40) and being subject at least to the fuel pressure present in said control chamber (40), said first member (36; 166) being in connection with further member means (44, 48, 50, 52, 54, 14; 51, 53; 107, 172) including plural members and said solenoid (44; 172) for transmitting the hydraulic forces acting upon said first member (36, 166) to said further member means, said solenoid (44; 172) in addition to its function as an actuating device for said pilot valve (46, 182) being also used to carry and to transmit said forces from one of said plural members of said further member means (50, 107, 166) to a next one of said plural members of said further member means (52, 53).

2. A fuel injector according to claim 1, wherein said further member means (48, 50, 52, 14) includes a second member (48) carrying and transmitting said forces from said first member (36) to a guide piece (50) located in a bore (64) provided in said injector housing (14) and radially guided therein; said guide-piece (50) radially guiding said pilot valve (46); said guide-piece (50) being in connection with said solenoid (44) for transmitting said forces resulting from the fuel pressure within said control chamber (40) to said solenoid (44); said solenoid (44) being in connection with a solenoid retaining member (52) and transmitting said forces to said solenoid retaining member (52); said solenoid retaining member (52) being connected to said injector housing (14) and therewith transmitting said forces to said injector housing (14).

3. A fuel injector according to claim 2, wherein said solenoid (44) is radially guided within said bore (64) in said injector housing (14).

4. A fuel injector according to claim 1, further comprising a pilot valve spring (68, 108) formed as a bendable bar both ends of which are pretensioned to a desired value, said bendable bar (68; 108) engaging said pilot valve (46) intermediate its ends.

5. A fuel injector according to claim 4, further comprising biasing means (72, 74) displaceable in the direction of the longitudinal axis (8) of said injector (10) for acting upon said pilot valve spring (68) whereby axial displacement at said biasing means (72, 74) results in a change of the biasing force exerted by said pilot valve spring (68) upon said pilot valve (46).

6. A fuel injector according to claim 4, further comprising biasing means (106) rotatable about the longitudinal axis (8) of said injector (10) for acting upon both ends of said pilot valve spring (108), whereby rotation of said biasing means (106) causes a change in the bias force exerted by said pilot valve spring (108) upon said pilot valve (46).

7. A fuel injector according to claim 5, wherein said biasing means (72, 74) includes two pins (72) and a nut (74), each pin (72) being received in a bore (72a) provided in the injector housing (14), one end of each pin (72) protruding out of said bore (72a) and contacting said nut (74), the other end of each pin (72) acting upon one end of said pilot valve spring (68), said nut (74) being provided with an internal thread engaging an external thread (54b) of the injector housing (14), whereby rotation of the nut (74) results in equal axial displacement of both pins (72).

8. A fuel injector according to claim 1, further comprising a solenoid retaining member (52) connected to said injector housing (14) for displacement in the direction of the injector's longitudinal axis (8) and acting upon said solenoid (44; 172), whereby axial displacement of said solenoid retaining member (52) results in a corresponding axial movement of at least said solenoid (44; 172) and of said first member (36; 166) to change the maximum valve lift (H) that can be performed by the injector needle valve (18) during each intermittent injection event.

9. A fuel injector according to claim 7, further comprising a solenoid retaining member (52) connected to said injector housing (14) for displacement in the direction of the injector's longitudinal axis (8) and acting upon said solenoid (44; 172), whereby axial displacement of said solenoid retaining member (52) results in a corresponding axial movement of at least said solenoid (44; 172) and of said first member (36; 166) to change the maximum valve lift (H) that can be performed by the injector needle valve (18) during each intermittent injection event, and including means for locking said solenoid retaining member (52) and said nut (74) after having set said desired bias force of said pilot valve spring (68) and said maximum valve lift (H).

10. A fuel injector according to claim 9, wherein said solenoid retaining member (52) is provided with a first sleeve (76a) having at least one slot and wherein said nut (74) is provided with a second sleeve (76b) having at least one slot, one of said first and second sleeves (76a, 76b) overlapping the other of said first and second sleeves (76a, 76b), said one first or second sleeve overlapped by said other first or second sleeve having an internal thread engaging said external thread (54b) of said injector housing (14), a clamp (78) being placed around said one sleeve (76a) overlapping said other sleeve (76b), whereby tensioning said clamp (78) creates an elastic deformation and an engagement of the sleeves (76a, 76b) with one another and with the external thread (54b) of the injector housing (14) to lock said solenoid retaining member (52) and said nut (74).

11. A fuel injector according to claim 2, wherein said second member (48) is radially shiftable in the direction of a further axis (90) which is perpendicular to the injector longitudinal axis (8) by means of a planar surface (50a) in common between said second member (48) and said guide-piece (50), said planar surface (50a) being inclined with respect to a contacting planar surface (48a) between said second member (48) and said first member (36), said contacting planar surface (48a) being perpendicular to the injector longitudinal axis (8), whereby a radial shift of said second member (48) results in a change of the amount of travel that can be performed by said pilot valve (46) enabling adjustment of said amount of travel to a desired, optimal value.

12. A fuel injector according to claim 11, further comprising an adjustment member (94) mounted for rotation about said further axis (90); said adjustment member (94) being provided with a thread (96) engaging a corresponding thread provided in said second member (48), said adjustment member (94) being further provided with an enlarged portion (98) having a contacting surface (98a) engaging the injector housing (14) for defining the inner position of the adjustment member (94) relative to the injector housing (14), further comprising means (100) defining the outer position of said adjustment member (94) with respect to the injector housing (14), whereby rotation of said adjustment member (94) results in a shift only of said second member (48) in the direction of said further axis (90).

13. A fuel injector according to claim 12, wherein the inclination of said inclined planar surface (50a) is such that when said second member (48) is moved in the direction of said contacting surface (98a) the amount of travel of said pilot valve (46) is increased.

14. A fuel injector for intermittently injecting fuel into the combustion chamber of an internal combustion engine, comprising a housing (14) with a valve seat (22) and at least one discharge orifice (24), an elongated injector valve member (18) provided with a piston member (26) and mounted within said housing (14) for engagement with said valve seat (22) for closing said discharge orifice (24), said injector valve member (18) being shiftable in its axial direction to be momentarily lifted from said valve seat (22) to open said discharge orifice (24), to allow for the injection of a desired quantity of fuel into the combustion chamber of the related internal combustion engine, a control chamber (40) provided in said housing (14) and being connectable to a fuel supply line (12); the fuel pressure in said control chamber (40) acting upon said piston member (26) of said injector valve member (18) forcing the latter against said valve seat (22), means (34, 38, 44, 46; 172, 182) for quickly reducing and quickly restoring the fuel pressure in said control chamber (40) to allow for the momentary axial movement of said injector valve member (18), said reducing or restoring means including a first orifice (34) and a second orifice (38) opening into said control chamber (40), electromagnetically controlled pilot valve means (46; 182) for closing and temporarily opening one end of said second orifice (38) and a solenoid (44; 172) for opening said pilot valve means (46; 182) depending upon applied electric pulses of a predetermined duration; said solenoid (44; 172) having pole faces (148, 150) and being formed by a round body (122) with an outer round section (126), an inner round section (138) and a stator plate (124), both inner and outer round sections (126, 138) being part of one work piece and being connected together at the side opposite to said pole faces (148, 150) of said solenoid (44; 172), said stator plate (124) being placed and positioned in said outer round section (126) and defining with an outer surface together with at least a planar surface of said inner round section (138) a common plane being perpendicular to the circumferential surface (146) of said solenoid (44; 172) and being generally parallel to a surface (52a) of said solenoid (44, 172) provided on the side opposite to the solenoid pole faces (148, 150) said pilot valve means (46, 182) being provided with an armature or pilot valve plate (62; 176) having an outer diameter substantially smaller compared to the diameter of said circumferential surface (146), one of said pole faces (148) being formed between an inner portion of said stator plate (124) and an outer portion of said armature or pilot valve plate (62; 176), the other of said pole faces (150) being formed by an inner portion of said armature or pilot valve plate (62; 176) and said planar surface of said inner round section (138) of said round body (122), a solenoid coil (130) of said solenoid (44; 172) being placed in an inner space of said round body (122) delimited by the circumferential surface of said inner round section (138), the inner circumferential surface of said outer round section (126) and the inner surface of said stator plate (124).

15. A fuel injector according to claim 14, wherein the fuel discharged during every one intermittent operation of said pilot valve means (46) from one of said orifices (38) into a region (42) of low fuel pressure is subsequently returned at a low fuel pressure via a return fuel path to a fuel tank, said return fuel path comprising a first bore (152) provided in a stem (60) of said pilot valve (46), said first bore (152) being in communication with a second bore (156) arranged within said solenoid (44), said first and second bores (152, 156) being axially aligned and extending in the direction of the longitudinal axis (8) of said solenoid (44).

16. A fuel injector according to claim 14, wherein forces resulting from the fuel pressure present in said control chamber (40) are carried and transmitted by said outer round section (126) of said body (122) of said solenoid (44, 172).

17. A fuel injector according to claim 16, wherein the cross sectional area of said outer round section (126) is substantially larger than the surface area of either one of said pole faces (148, 150).

18. A fuel injector according to claim 15, wherein a stop member (154) is placed in and firmly held by said inner round section (138), said stop member (154) protruding by a given amount (L) beyond a surface of said inner round section (138) and in the switched-on state of the pilot valve (46) defining a gap (L) between the surface of said armature or pilot valve plate (62) facing said pole faces (148, 150) and said pole faces (148, 150).

19. A fuel injector according to claim 18, wherein said stop member (154) is of a cylindrical shape with an end surface thereof protruding beyond said inner round section (138) being flat and parallel to said pole faces (148, 150), said stop member (154) further being provided with a bore forming part of said second bore (156) arranged within said solenoid (44).

20. A fuel injector according to claim 14, further comprising a member (166) defining in part said control chamber (40), said outer round section (126) of said solenoid (172) being provided with an extended portion (170) extending beyond a plane defined by the lower surface of said stator plate (124) and said inner round section (138), said member (166) being supported by said extended portion (170) by means of a contacting surface (170a) thereof, thereby transmitting the forces resulting from the fuel pressure in said control chamber (40) to said solenoid (172); the armature (176) of said pilot valve means (182) and at least the portion (178) of a stem (180) of said pilot valve means (182) opening and closing the outlet of one of said orifices (38) being arranged in a space (174) defined by an upper end surface of said member (166), said pole faces (148, 150) and the inner round surface of said extended portion (170).

21. A fuel injector according to claim 14, wherein a stop member (184) is placed in a central area of said inner round section (138), said stop member (184) protruding by a given amount (L) beyond a surface of said inner round section (138) and during the switched-on state of said solenoid (172) defining a gap (L) between the side of said armature or pilot valve plate (176) facing said pole faces (148, 150) and said pole faces (148, 150), further comprising means for moving and positioning said stop member (184) in said solenoid (172) to set a desired amount of travel (P) of said pilot valve (182) by changing said given amount (L) of protrusion of said stop member (184).

22. A fuel injector according to claim 21, wherein said stop member (184) is of elongate, cylindrical shape and is radially guided within said inner round section (138), said elongate stop member (184) being provided with an outer thread (192b) engaging a corresponding inner thread (192a) provided in said inner section (138), said elongated stop member (184) being axially moved and positioned by threading in or out said elongate stop member (184) into said inner round section (138).

23. A fuel injector according to claim 14, wherein said pilot valve means (182) is radially guided within a bore place in the central area of said inner round section (138) of said solenoid (172) by means of a portion of its stem (180), said stem (180) being firmly connected to said armature or pilot valve plate (176).

24. A fuel injector according to claim 22, wherein said pilot valve means (182) is radially guided within a bore in the central area of said inner round section (138) of said solenoid (172) by means of a portion of its stem (180), said stem (180) being firmly connected to said armature or pilot valve plate (176), wherein said portion of said stem (180) is radially guided within a bore axially arranged in said elongate stop member (184).

25. A fuel injector according to claim 23, further comprising a pilot valve spring (196) the biasing force of which is transmitted to the upper end of said portion of said stem (180) of said pilot valve means (182) by means of an intermediate piece (189).

26. A fuel injector according to claim 23, further comprising a fuel return path for returning the fuel discharged during every one intermittent operation of said pilot valve means (182), from one of said orifices (38) into a region (174) of low fuel pressure, at a low fuel pressure to the fuel tank, said fuel return path including at least a first bore (186) provided in the section of said stem (180) close by the outlet of said one of said orifices (38), one end of said first bore (186) opening into said low pressure region (174), said fuel return path further comprising a second bore (188) provided in said stem (180) and extending along the longitudinal axis (8) thereof, the other end of said first bore (186) opening into said second bore (188), said fuel return path further comprising a side bore (190) connecting a disc-shaped space (164) provided between said pole faces (148, 150) with said second bore (188).

27. A fuel injector according to claim 14, wherein said armature or pilot valve plate (62; 176) of said pilot valve means (46; 182) is provided with at least two bores (158) connecting the side of said armature or pilot valve plate (62; 176) facing said pole faces (148, 150) with the opposite side of said armature or pilot valve plate (62; 176).

28. A fuel injector according to claim 27, wherein the axes of said bores (158) are placed on a graduated circle (162) located in the middle between the inner border of said stator plate (124) and the circumference of said inner round section (138).

* * * * *

UNITED STATES PATENT AND TRADEMARK OFFICE
CERTIFICATE OF CORRECTION

PATENT NO. : 4,946,103

DATED : August 7, 1990

INVENTOR(S) : Marco A. Ganser

It is certified that error appears in the above-identified patent and that said Letters Patent is hereby corrected as shown below:

On the title page:
Item [30], change "04792/87" to --04702/87--.

Signed and Sealed this

Fourteenth Day of January, 1992

Attest:

HARRY F. MANBECK, JR.

*Attesting Officer*      *Commissioner of Patents and Trademarks*